UNITED STATES PATENT OFFICE.

WALTER D. FIELD, OF MILLBURN, NEW JERSEY.

PROCESS OF PRODUCING SULPHURETED OILS AND PRODUCTS THEREOF.

SPECIFICATION forming part of Letters Patent No. 498,162, dated May 23, 1893.

Application filed October 18, 1892. Serial No. 449,287. (No specimens.)

*To all whom it may concern:*

Be it known that I, WALTER D. FIELD, a citizen of the United States, residing at Millburn, in the county of Essex and State of New Jersey, have invented certain new and useful Improvements in Processes of Producing Sulphureted Oils and Products Thereof; and I do hereby declare the following to be a full, clear, and exact description of the invention, such as will enable others skilled in the art to which it appertains to make and use the same.

In my patent No. 473,306, dated April 19, 1892, I have described a composition of matter consisting of the sulphur derivatives or compounds of the glycyl or glyceryl ethers of the unsaturated fatty acids, and soluble in benzine and pyroxyline or nitro cellulose and one form of those glycyl or glyceryl ethers combined with sulphur to form sulphur balsam, together with pyroxyline. In that patent I described the method of producing sulphur balsams by adding sulphur directly to the non drying oils at a temperature of 210° centigrade. When sulphur balsams are thus produced a partial decomposition takes place in the oil and hydro-carbons of unsavory odor are formed, which remain in the finished product and give it an offensive odor which detracts seriously from its usefulness in certain of the arts in which it would otherwise be useful. Also in the said described process of making sulphur balsam large quantities of hydrogen sulphide are evolved at the high temperature necessary to produce the combination between the oil and the sulphur and some of this hydrogen sulphide remains in solution in the sulphur balsam and can only be removed by thoroughly washing the sulphur balsam with lime water.

It is very desirable when making these sulphur compounds or derivatives of the glycyl or glyceryl ethers of the unsaturated fatty acids, to avoid a temperature so high that these hydro-carbons and hydrogen sulphides will be evolved and to thus obtain a product of more agreeable odor. And it has been the object of my experiments to discover some practical method of making this combination at comparatively low temperatures and I have succeeded to the extent hereinafter described. It is well known that the chlorides of sulphur when added to drying and non-drying oils produce an elastic caoutchouclike mass which is known in the arts as rubber substitute. This substance is insoluble in benzine and other hydro-carbons, methyl alcohol, ethyl alcohol and amyl alcohol and their respective ethers and in most, if not all, of the other known solvents of oils. I have discovered that sulphur chlorides can be so added to the glycyl ethers of the unsaturated fatty acids as to produce heavy liquid oil bodies, soluble in benzine, hydro-carbons and in ethers of the aforesaid alcohols, and that by this means sulphur can be added to or combined with the aforesaid glycyl ethers at a comparatively low temperature, thus avoiding the evolution of hydro-carbons and hydrogen sulphides during the process.

In order to produce this compound I proceed as follows: I take one hundred pounds of any oil of the above named series or of those oils named in my patent No. 473,306 as being useful in the composition therein described, and dilute the same with from one half to equal volumes of benzine of 62° Baumé gravity. I then add about twenty-five per cent. of sulphur chloride very slowly with constant stirring, taking care that the temperature of the mass does not rise to 40° centigrade. The amount of the sulphur chloride may vary a little with different oils and at different times, but I have found twenty-five per cent. to be generally about the right quantity, but I advise any operator to make a trial mixture before endeavoring to produce the product on a large scale, as he will thus ascertain exactly the proportion of the particular chloride of sulphur which he is using required with the particular oil which he is using. After the sulphur chloride has gone into combination with the oil and the reaction is complete, I heat the mixture over a water bath to drive off all the benzine and hydro chloride acid, not permitting the temperature to rise above 98° centigrade, and this heating is continued until the composition is neutral or practically so, which can be easily ascertained by the use of blue litmus paper.

Heretofore when oils have been treated with chloride of sulphur, it has been customary to neutralize the compound of chloride of sulphur and oil by treating the same with a neutralizing agent. This method of neutralizing is not adapted to my purposes, first, because it leaves the chlorine and the acid in the compound in combination with the neutralizing agent in the form of a salt, which salt is liable to decompose and set free the acid and the chlorine, causing a decomposition of the compound or anything to which it is applied, and even where the salt does not decompose, it remains in the compound as an undesirable ingredient; second, because the method of neutralization by a neutralizing agent in no way disposes of the benzine which remains in mechanical mixture with the oil.

It is proper to add that while I prefer to use benzine as the diluent of the oil to be treated and have found it well adapted to my purposes, I do not desire to limit myself to its use, as any hydro-carbon which can be evaporated from the mixture at a temperature of 98° centigrade or lower, and which is a solvent of the oil and remains unaffected by or unacted upon by sulphur chloride can be used to replace the benzine, for example benzole or toluene may be used, of course, as is well understood, care must be taken to give time for the evaporation of the hydro-carbon to completely take place, which will be longer in the case of hydro-carbons having boiling points higher than 98° centigrade than with hydro-carbons having a lower boiling point. When the product is neutral, I remove the same from the water bath and permit it to cool to the ordinary temperature and the process is then complete.

In an application filed by me on even date with this Serial No. 449,288 I claim the product formed by sulpurating a glycyl or glyceryl ether of the unsaturated fatty acids that has been increased in density or thickness by blowing air through non-drying oils heated to 200° centigrade. The action of the air produces an oxydizing effect and forms oxy-fatty acid ether of glyceryl. Oils thus prepared are known in the art as blown oils and have been used for lubricating purposes. They are thick viscous oils, practically neutral and have about the same solubilities as the raw oils. I have discovered that these oils so treated by air and known as blown oils can be combined with sulphur in the way described in my said patent and also in my application of even date herewith, and will produce, when so combined, a body similar in all its physical characteristics to the bodies described in my said application and in my said patent, but apparently more stable than the similar bodies made from the raw oils and somewhat cheaper, owing to the fact that lesser amounts of sulphur can be used than with the raw oils.

I prepare the blown oil as follows: I take one hundred pounds of any non-drying glycyl ether of an unsaturated fatty acid, heat the same to about 200° centigrade and then drive air through the heated oil, keeping it in constant motion until the requisite density is reached, which I have found to be when the oil reaches a specific gravity of about .89. It is necessary to fix upon some density of the blown oil in order to control the density of the finished sulphur product as some oils grow more dense in the operation of blowing than others, and I have found the above degree of density to be about right for ordinary uses, although for some purposes it may be requisite to increase or diminish the density. The oil is allowed to cool and is then sulphurated by adding the sulphur chloride in the manner heretofore described.

What I claim as new is—

1. The process of producing those sulphur derivatives or compounds of the glycyl or glyceryl ethers of the unsaturated fatty acids known as sulphur balsams, which consists in combining the non-drying glycyl or glyceryl ethers of the unsaturated fatty acids with benzine or its equivalent, then adding chloride of sulphur at a temperature under 40° centigrade and when the combination with the chloride of sulphur is complete driving off the benzine or its equivalent, chlorine and free acid by heat, substantially as described.

2. A new composition of matter consisting of a glycyl or glyceryl ether of the unsaturated fatty acids increased in density by blowing, and chloride of sulphur.

In testimony whereof I affix my signature in the presence of two witnesses.

WALTER D. FIELD.

Witnesses:
WILLIAM S. DODD,
CHAS. W. BROWER.